(12) United States Patent
Ferguson et al.

(10) Patent No.: US 9,141,586 B2
(45) Date of Patent: Sep. 22, 2015

(54) METHOD, APPARATUS, SYSTEM FOR SINGLE-PATH FLOATING-POINT ROUNDING FLOW THAT SUPPORTS GENERATION OF NORMALS/DENORMALS AND ASSOCIATED STATUS FLAGS

(71) Applicants: Warren E. Ferguson, Beaverton, OR (US); Brian J. Hickmann, Sherwood, OR (US); Thomas D. Fletcher, Sherwood, OR (US)

(72) Inventors: Warren E. Ferguson, Beaverton, OR (US); Brian J. Hickmann, Sherwood, OR (US); Thomas D. Fletcher, Sherwood, OR (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 13/725,268

(22) Filed: Dec. 21, 2012

(65) Prior Publication Data

US 2014/0181169 A1    Jun. 26, 2014

(51) Int. Cl.
*G06F 7/499* (2006.01)
*G06F 17/10* (2006.01)
*G06F 7/00* (2006.01)

(52) U.S. Cl.
CPC *G06F 17/10* (2013.01); *G06F 7/00* (2013.01); *G06F 7/4991* (2013.01); *G06F 7/49942* (2013.01); *G06F 7/49968* (2013.01); *G06F 7/49973* (2013.01)

(58) Field of Classification Search
USPC ............... 708/495–498, 550–553; 712/222
See application file for complete search history.

(56) References Cited

U.S. PATENT DOCUMENTS

| | | | |
|---|---|---|---|
| 2002/0198917 A1* | 12/2002 | Steele, Jr. | 708/495 |
| 2003/0005013 A1* | 1/2003 | Steele, Jr. | 708/495 |
| 2007/0061391 A1* | 3/2007 | Tan et al. | 708/495 |

* cited by examiner

*Primary Examiner* — Chat Do
*Assistant Examiner* — Calvin M Brien
(74) *Attorney, Agent, or Firm* — Lowenstein Sandler LLP (57) ABSTRACT

A mechanism for performing single-path floating-point rounding in a floating point unit is disclosed. A system of the disclosure includes a memory and a processing device communicably coupled to the memory. In one embodiment, the processing device comprises a floating point unit (FPU) to generate a plurality of status flags for a rounded value of a finite nonzero number. The plurality of status flags are generated based on the finite nonzero number without calculating the rounded value of the finite nonzero number. The plurality of status flags comprises an overflow flag and an underflow flag. The FPU determines whether a rounded value should be calculated for the finite nonzero number based on the plurality of status flags and whether the overflow flag is asserted. Upon determining that the rounded value should be calculated for the finite nonzero number based on the plurality of status flags and that the overflow flag is asserted, the FPU calculates the rounded value of the finite nonzero number based on an overflow rounding. Upon determining that the rounded value should be calculated for the finite nonzero number based on the plurality of status flags and that the overflow flag is not asserted, the FPU calculates the rounded value of the finite nonzero number based on a blended reduced precision rounding.

20 Claims, 7 Drawing Sheets

METHOD, APPARATUS, SYSTEM FOR SINGLE-PATH FLOATING-POINT ROUNDING FLOW THAT SUPPORTS GENERATION OF NORMALS/DENORMALS AND ASSOCIATED STATUS FLAGS

TECHNICAL FIELD

The embodiments of the disclosure relate generally to processing devices and, more specifically, relate to a single-path floating-point rounding flow that supports the generation of normals, denormals, and associated status flags.

BACKGROUND

Computing systems can perform extensive amount of calculations. Floating point hardware, such as a floating point unit (FPU), is a part of a computer system that is specifically designed to carry out operations on floating point numbers. Floating point refers to a representation of a number where a radix point (decimal point, or, more commonly in computers, binary point) can "float"; that is, can be placed anywhere relative to the significant bits of the number. This position is indicated separately in the internal representation, and floating-point representation can thus be thought of as a computer realization of scientific notation. Typical operations performed by floating point hardware on floating point numbers are addition, subtraction, multiplication, division, and square root. In most general purpose computer architectures, one or more FPUs are integrated with the processor.

When an operation is performed on floating point numbers, the result of the operation can result in zero, infinity, Not-A-Number (NaN), or a finite nonzero number. The destination of the operation, such as a register or memory to store the result of the operation, can have a limited number of bits. However, in the case the result is a finite nonzero number, the result can have a number of bits that is greater than the number of bits available in the destination of the results (e.g., a finite number that takes an infinite number of bits to describe it, such as ⅓). To address the case where the finite nonzero number has a number of bits that is greater than the number of bits available in the destination for the finite nonzero number, the floating point unit can perform a rounding operation on the finite nonzero number such that the rounded value of the finite nonzero number can fit in the destination.

The rounding process can calculate a rounded value of the finite nonzero number and status flags based on the rounded value. The format of the rounded value can be represented by a floating point value composed of a mantissa, an exponent value (which can be positive or negative), and a sign (positive or negative) of the floating point value. A mantissa (also known as a significand) is part of the rounded value that includes its significant bits, which includes at least one integer bit and a fraction part. The status can include three flags: a precision flag, an underflow flag, and an overflow flag. The precision flag can represent whether the rounded value is an inexact version (smaller or bigger than) of the finite nonzero number. The overflow flag can represent whether the exponent of the rounded value is too big to be represented by the number of available bits for the exponent. The underflow flag can represent whether the exponent of the rounded value is too small to be represented by the number of available bits for the exponent.

Multiple solutions have been utilized to perform the rounding process to generate a rounded value of the finite nonzero number and status flags associated with the rounded value. One approach calculates a rounded value by performing a first rounding of the finite nonzero number, generates the status flags based on the rounded value, and escapes to a microcode program or a user-level program when any of the status flags are asserted (such as set to the value 1). In this approach, input from the microcode program or user-level program is required to complete the rounding process and the rounding process can therefore slow down the computing system.

Another approach requires a two-pass rounder that performs a first rounding by calculating a first rounded value of the finite nonzero number and generating the status flags based on the first rounded value. If the status flags indicate that the first rounding was subject to overflow (rounded value too big) or underflow (rounded value too small), a second rounding can be performed by calculating a second rounded value of the finite nonzero number. The two-pass rounder can be inefficient because two rounding operations may be necessary. Moreover, the two-pass rounder can cause delay in the system because of the multiple rounding operations required.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide for a single-path floating-point rounding operation or flow that supports the generation of zeros, normals, denormals, infinity, and associated status flags. In one embodiment, a system of embodiments of the disclosure includes a memory and a processing device communicably coupled to the memory. In one embodiment, the processing device comprises a floating point unit (FPU) to generate a plurality of status flags for a rounded value of a finite nonzero number. The plurality of status flags are generated based on the finite nonzero number without calculating the rounded value of the finite nonzero number. The plurality of status flags comprises an overflow flag and an underflow flag. The FPU determines whether a rounded value should be calculated for the finite nonzero number based on the plurality of status flags and whether the overflow flag is asserted. Upon determining that the rounded value should not be calculated for the finite nonzero number based on the plurality of status bits, the FPU does not calculate a rounded value for the finite nonzero number. Upon determining that the rounded value should be calculated for the finite nonzero number based on the plurality of status flags and that the overflow flag is asserted, the FPU calculates the rounded value of the finite nonzero number based on an overflow rounding. Upon determining that the rounded value should be calculated for the finite nonzero number based on the plurality of status flags and that the overflow flag is not asserted, the FPU calculates the rounded value of the finite nonzero number based on a blended reduced precision rounding.

Figure 1:
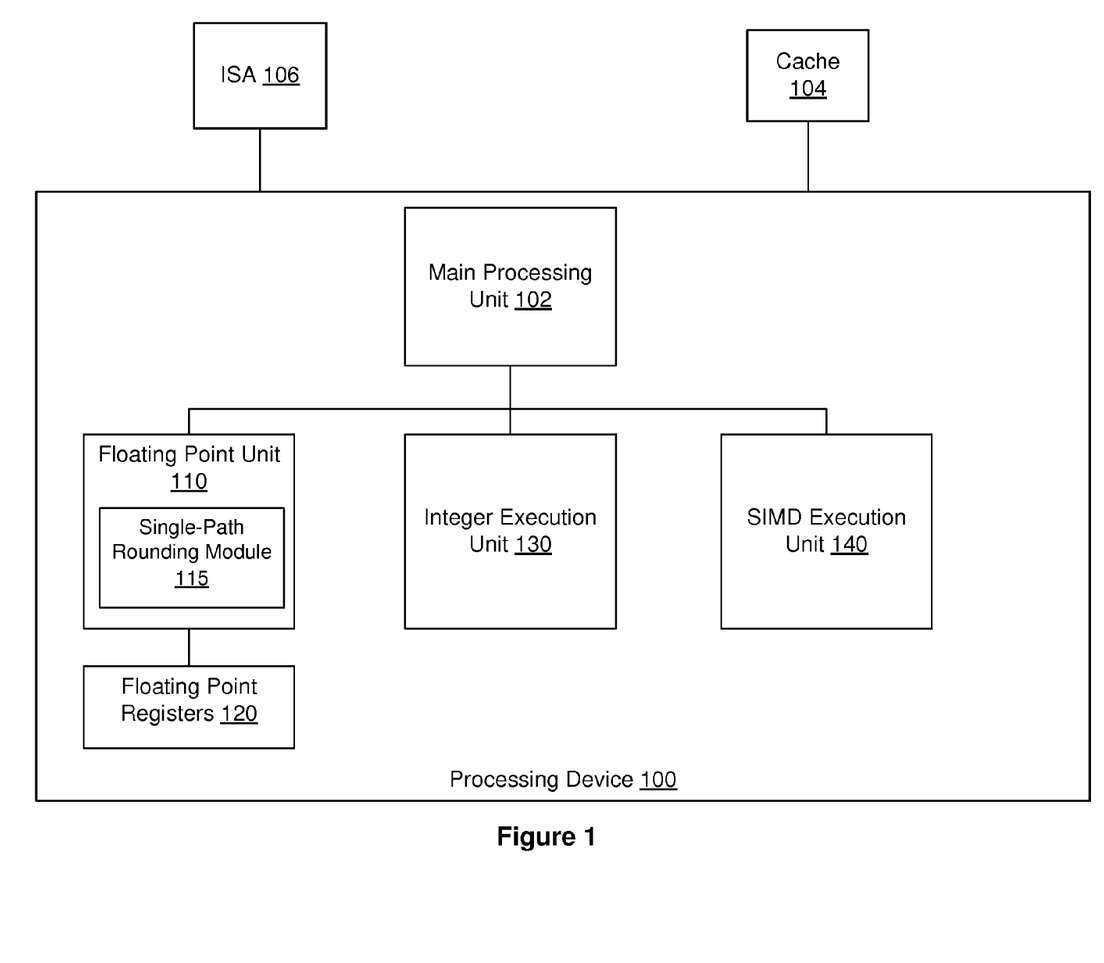
FIG. 1 is a block diagram of one embodiment of a processing device that implements single-path floating-point rounding.

FIG. 1 is a block diagram of one embodiment of a processing device 100 that implements single-path floating-point rounding in floating point units. Processing device 100, sometimes referred to as "processor" or "central processing unit (CPU)", includes a main processing unit 102, which executes software instructions. Some of these software instructions use additional processor resources, a floating point unit (FPU) 110, an integer execution unit 130, a single instruction multiple data (SIMD) unit 140, and/or any other processor resources. In one embodiment, FPU 110, integer execution unit 130, and SIMD unit 140 are hardware components. In other embodiments, FPU 110, integer execution unit 130, and SIMD unit may be implemented individually, or as a combination of hardware, software, or firmware. Although each of these processor resources is illustrated inside the processing device 100, any of these and/or other processor resources may be located outside the processing device 100. Furthermore, although a single instance of each of FPU 110, integer execution unit 130, and SIMD execution unit 140 is illustrated, more than one of each component may be included in processing device 100.

Processing device 100 may be communicably coupled to cache 104, which stores data and/or instructions that are used by the main processing unit 102. In one embodiment, cache 104 may be part of a memory, such as random access memory (RAM), communicably coupled to processing device. In other embodiment, cache 104 may reside in processing device 100, such as a Layer 1 (L1) cache or Layer 2 (L2) cache. Main processing unit 102 executes based on instruction set architecture (ISA) 106 of processing device 100. ISA 106 includes microcode that is implemented to achieve a defined set of assembly language instructions that are executed by the processing device 100, including main processing unit 102, and define the architecture of the processing device 100. The architecture of processing device 100 defined by ISA 106 includes, but is not limited to, native data types, instructions, registers, addressing modes, memory architecture, interrupt and exception handling, and external input/output (I/O). ISA 106 includes a specification of a set of opcodes (machine language) and the native commands implemented by processing device 100.

Processing device 100 may execute one or more instructions of a program, such as a program (or portions of a program) stored in cache 104, for example. These instructions may require specialized operations to be performed by one of the FPU 110, integer execution unit 130, or SIMD execution unit 140. Each of these units 110, 130, 140 is specialized to carry out specific operations for the processing device. For example, the integer execution unit 130 performs mathematical operations using integer operands. The SIMD execution unit 140 performs SIMD operations using multiple data operands. The FPU 110 performs mathematical operations using floating-point operands.

Floating point refers to a representation of a number where a radix point (decimal point, or, more commonly in computers, binary point) can "float"; that is, can be placed anywhere relative to the significant bits of the number. This position is indicated separately in the internal representation, and floating-point representation can thus be thought of as a computer realization of scientific notation. Operations performed by FPU 110 on floating point numbers can include, for example, addition, subtraction, multiplication, division, and square root. Results of operations performed by FPU 110 are stored in floating point registers 120.

The result of an operation can be a finite nonzero number. However, the finite nonzero number that is a result of an operation may not fit in the floating point register 120, and thus may need to be rounded prior to being stored. The result of an operation that is a finite nonzero number can be represented by a mantissa, an exponent value, and a sign (positive or negative) of the finite nonzero number. The number of bits available to store a result of an operation in the floating point registers 120 can be defined by a standard, such as the IEEE 754 Standard for Floating-Point Arithmetic, IEEE Std. 754-2008, published Aug. 29, 2008 (IEEE 754). The number of bits to store the mantissa, the exponent value, and the sign of a value can be defined by the standard. For example, for single precision calculations, IEEE 754 uses 23 bits to represent the fraction portion of the mantissa, 8 bits to represent the exponent value, and one bit to represent the sign (positive or negative) of the mantissa. As a result, 23+8+1 adds to 32 bits, which is the number of bits in a 32-bit machine utilized for single precision calculations and the number of bits that can be used to store the rounded value. In another example, for double precision calculations, IEEE 754 uses 52 bits to represent the fraction portion of the mantissa, 11 bits to represent the exponent value, and one bit to represent the sign (positive or negative) of the exponent value. As a result, 52+11+1 adds to 64 bits, which is the number of bits in a 64-bit machine utilized for double precision calculations and the number of bits that can be used to store the rounded value.

In one embodiment, FPU 110 includes a single-path rounding module 115 to implement single-path floating-point rounding of finite nonzero numbers from FPU calculations by the FPU 110. In one embodiment, the single-path rounding module 115 is implemented in hardware. The single-path rounding module 115 can generate status flags for a rounded value of a finite nonzero number based on the finite nonzero number and independent of, and without, calculating the rounded value of the finite nonzero number. The single-path rounding module 115 can determine whether a rounded value should be calculated for the finite nonzero number based on the generated status flags. Upon determining that a rounded value should not be calculated, the single-path rounding module 115 may not calculate a rounded value of the finite nonzero number and can return the status flags to the FPU 110 or a microcode program or a user-level program executing on the processing device 100. Upon determining that a rounded value should be calculated and the overflow flag is asserted, the single-path rounding module 115 can calculate a rounded value of the finite nonzero number based on an overflow rounding. Upon determining that a rounded value should be calculated and the overflow flag is not set to a predefined value, the single-path rounding module 115 can calculate the rounded value of the finite nonzero number based on a blended reduced precision rounding. If the single-path rounding module 115 calculates a rounded value of the finite nonzero number, the single-path rounding module 115 can return the rounded value and the status flags to the FPU 110 or a microcode program or a user-level program executing on the processing device 100.

Figure 2:
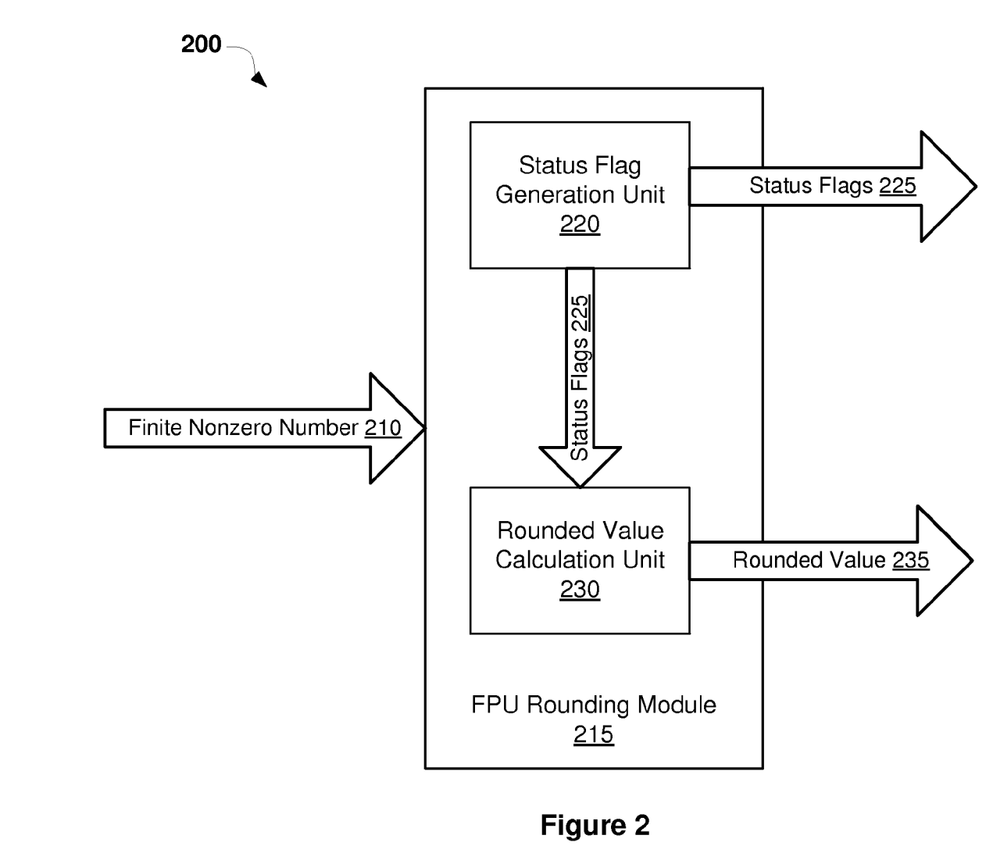
FIG. 2 is a block diagram depicting one embodiment of a single-path floating point rounding operation.

FIG. 2 is a block diagram depicting one embodiment of a single-path floating-point rounding operation 200 performed by an FPU. An FPU rounding module 215 is shown. In one embodiment, the FPU rounding module 215 is the same as FPU rounding module 115 described with respect to FIG. 1.

The FPU rounding module 215 includes a status flag generation unit 220 and a rounded value calculation unit 230. Note that in alternative embodiments, the functionality of one or more of the status flag generation unit 220 and the rounded value calculation unit 230 may be combined or divided.

In one embodiment, the FPU rounding module 215 receives as input a finite nonzero number 210. The finite nonzero number 210 can be a finite number that is not zero, not infinity, and not a Not-A-Number (NaN).

The status flag generation unit 220 can generate the status flags 225 for a rounded value of the finite nonzero number using the finite nonzero number 210 and without calculating the rounded value of the finite nonzero number. Therefore, the status flag generation unit 220 can generate the status flags 225 for the rounded value of the finite nonzero number without actually rounding the finite nonzero number 210. In some embodiments, the status flag generation unit 220 can generate the status flags 225 by analyzing the bits of a normalized form of the finite nonzero number 210. The normalized form of the finite nonzero number 210 can include a mantissa made up of a leading bit of 1 and a number of fraction bits (the number of fraction bits can be an infinite number), multiplied by a 2 to the power of an exponent. Upon generating the status flags 225, the status flag generation unit 220 can determine whether a rounded value of the finite nonzero number 210 should be calculated based on the status flags 225. If the status flag generation unit 220 determines that the rounded value of the finite nonzero number 210 should be calculated, the status flag generation unit 220 can send the status flags 225 to the rounded value calculation unit 230. Regardless of whether the status flag generation unit 220 determines that the rounded value should or should not be calculated, the status flag generation unit 220 can send the status flags 225 to an application, such as a microcode program or a user-level program that may require being informed of the status flags.

The rounded value calculation unit 230 can calculate a rounded value 235 for the finite nonzero number 210 upon receiving the status flags 225 from the status flag generation unit 220. Upon determining that a rounded value 235 should be used and that the overflow flag is asserted (e.g., overflow flag is positive), the rounded value calculation unit 230 can calculate the rounded value 235 for the finite nonzero number 210 based on an overflow rounding. The overflow rounding can calculate the rounded value 235 to be the largest value possible for the number of bits that available to store the rounded value ($N_{max}$) or a predefined value for infinity.

Upon determining that a rounded value 235 should be used and that the overflow flag is not asserted or deasserted (e.g., overflow flag is negative), the rounded value calculation unit 230 can calculate the rounded value 235 for the finite nonzero number 210 based on a blended reduced precision rounding. The blended reduced precision rounding can calculate the rounded value 235 based on the exponent of the normalized form of the finite nonzero number 210. If the exponent of the normalized form of the finite nonzero number 210 is less than a predefined minimum level (e.g., less than −1022 for double precision and less than −126 for single precision), the blended reduced precision rounding calculates the rounded value 235 by rounding the denormalized form of the finite nonzero number 210. If the exponent of the normalized form of the finite nonzero number 210 is not less than a predefined minimum level (e.g., greater than or equal to −1022 for double precision and greater than or equal to −126 for single precision), the blended reduced precision rounding calculates the rounded value 235 by rounding the normalized form of the finite nonzero number 210.

Figure 3:
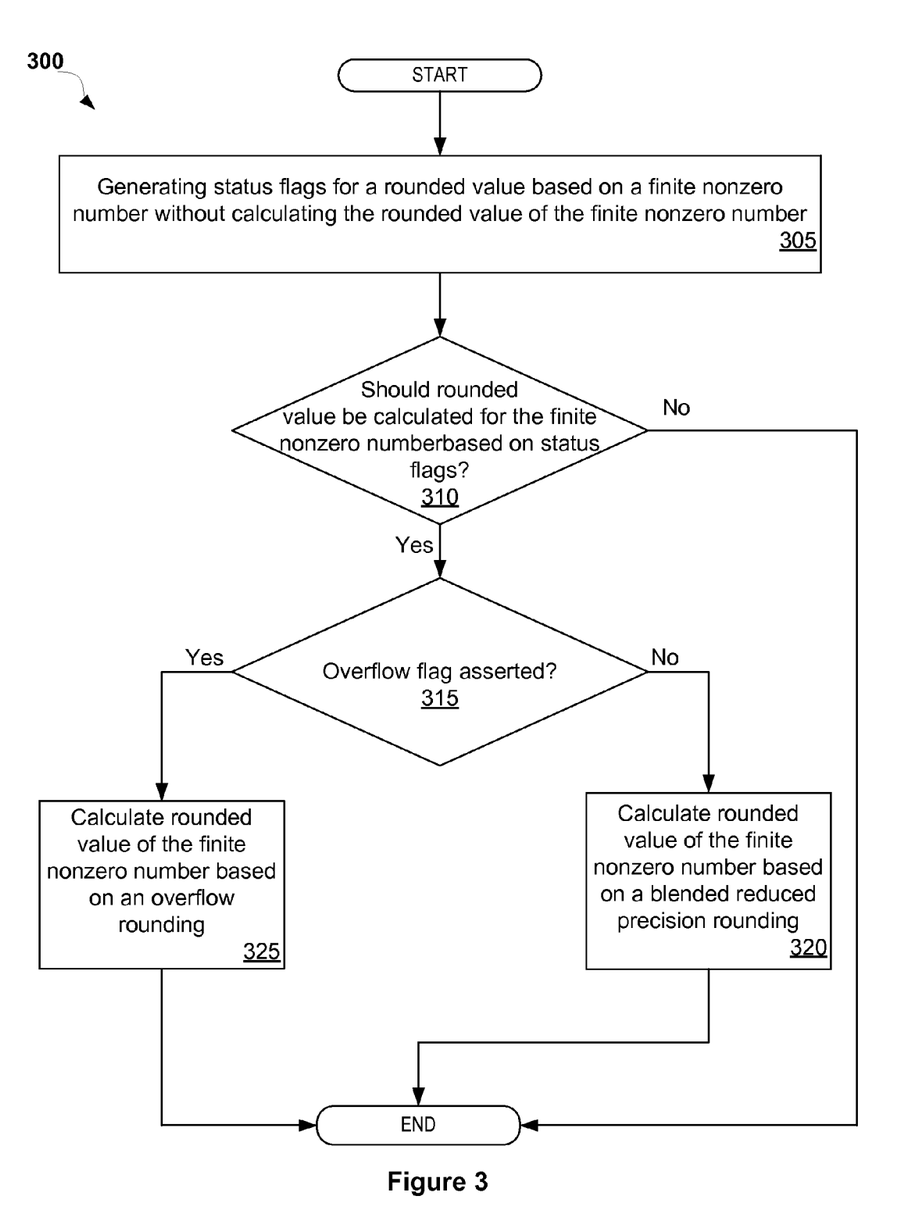
FIG. 3 is a flow diagram illustrating a method for a single-path floating-point rounding operation according to an embodiment of the disclosure.

FIG. 3 is a flow diagram illustrating a method 300 for single-path floating-point rounding operation according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by processing device 100, and more specifically FPU 110 of FIG. 1.

At block 305, processing logic generates status flags for a rounded value based on a finite nonzero number without calculating the rounded value of the finite nonzero number. The status flags can include a precision flag, an underflow flag, and an overflow flag. The precision flag can represent whether the rounded value is an inexact version (smaller or bigger than) of the finite nonzero number. The precision flag can be asserted (e.g., 1) if the rounded value is an inexact version of the finite nonzero number. The precision flag can be deasserted (e.g., 0) if the rounded value is an exact version of the finite nonzero number. The overflow flag can represent whether the exponent of the rounded value of the finite nonzero number is too big to be represented by the number of bits available to store the exponent. The overflow flag can be asserted (e.g., 1) if the exponent of the rounded value of the finite nonzero number is too big. The overflow flag can be deasserted (e.g., 0) if the exponent of the rounded value of the finite nonzero number is not too big. The underflow flag can represent whether the exponent of the rounded value is too small to be represented by the number of available bits for the exponent. The underflow flag can be asserted (e.g., 1) if the exponent of the rounded value of the finite nonzero number is too small. The underflow flag can be deasserted (e.g., 0) if the exponent of the rounded value of the finite nonzero number is not too small. One embodiment of a method for generating the status flags for a rounded value based on the finite nonzero number without calculating the rounded value of the finite nonzero number is described below with reference to FIGS. 4A and 4B.

At block 310, processing logic determines whether a rounded value should be calculated for the finite nonzero number based on the status flags. In one embodiment, processing logic determines that a rounded value should be calculated if any one of the status flags is asserted (e.g., positive value, 1, etc.). In this embodiment, if any of the precision flag, the underflow flag, and the overflow flag are asserted, processing logic determines that a rounded value should be calculated for the finite nonzero number, and the method 300 proceeds to block 315. In this embodiment, if none of the precision flag, the underflow flag, and the overflow flag are asserted (all of the flags are deasserted), processing logic determines that a rounded value should not be calculated for the finite nonzero number, and the method 300 ends.

In an alternate embodiment, processing logic determines that a rounded value should be calculated if there is no unmasked exception based on the status flags. An unmasked exception can represent whether an application, such as a microcode program or a user-level program, would like to be notified when one of the status flags is asserted (e.g., 1). The unmasked exception can be calculated as:

Unmasked exception=|({precision flag,underflow flag, overflow flag}&{~precision mask,~underflow mask,~overflow mask}), where

| is an OR operator,
& is an AND operator,
~ is a complement operator,
precision mask is a mask for the precision flag,
underflow mask is a mask for the underflow flag,
overflow mask is a mask for the overflow flag.

When an unmasked exception occurs, the application is notified and the rounded value of the finite nonzero number is not important because the rounded value will not be used by the application, and thus calculating the rounded value can be skipped. By skipping the calculation of the rounded value, processing power and time may be saved. In this embodiment, if there is no unmasked exception, processing logic determines that a rounded value should be calculated for the finite nonzero number, and the method 300 proceeds to block 315. In this embodiment, if there is an unmasked exception, processing logic determines that a rounded value should not be calculated for the finite nonzero number, and the method 300 ends.

At block 315, processing logic determines if the overflow flag is asserted. The overflow flag being asserted can indicate that an overflow will occur in the rounded value of the finite nonzero number. In one embodiment, the overflow flag is asserted when it equals a predefined value, such as 1. Processing logic can determine if the overflow flag is asserted by comparing the overflow flag to the predefined value. If processing logic determines that the overflow flag is asserted, the method 300 proceeds to block 325. If processing logic determines that the overflow flag is not asserted, the method 300 proceeds to block 320.

In some embodiments, blocks 305, 310, and 315 are not performed, and a rounded value of a finite nonzero number is calculated, independent of the value of the status flags. In these embodiments, the method 300 performs block 320 and then ends.

At block 320, processing logic calculates the rounded value of the finite nonzero number based on a blended reduced precision rounding. One embodiment of a method for calculating the rounded value of the finite nonzero number based on a blended reduced precision rounding is described below with reference to FIG. 5.

At block 325, processing logic calculates the rounded value of the finite nonzero number based on an overflow rounding. In one embodiment, the overflow rounding calculates the rounded value of the finite nonzero number by equating the rounded value to the largest value possible for the number of bits that available to store the rounded value, which can be a predefined number based on the computing system, represented by $N_{max}$. For single precision, $N_{max}$ is the largest value that can be stored in 23 bits for the mantissa, 8 bits of exponent, and 1 bit of sign, which is +1111111111111111111111*2^{11111111}$. For double precision, $N_{max}$ is the largest value that can be stored in 52 bits for the mantissa, 11 bits of exponent, and 1 bit of sign, which is +1111111111111111111111111111111111111111111111111111*2^{11111111111}$. In an alternate embodiment, the overflow rounding calculates the rounded value of the finite nonzero number by equating the rounded value to a predefined value for infinity. The predefined value for infinity can be predefined by a standard and can be specific to the floating point unit performing the rounding process.

Figure 4A:
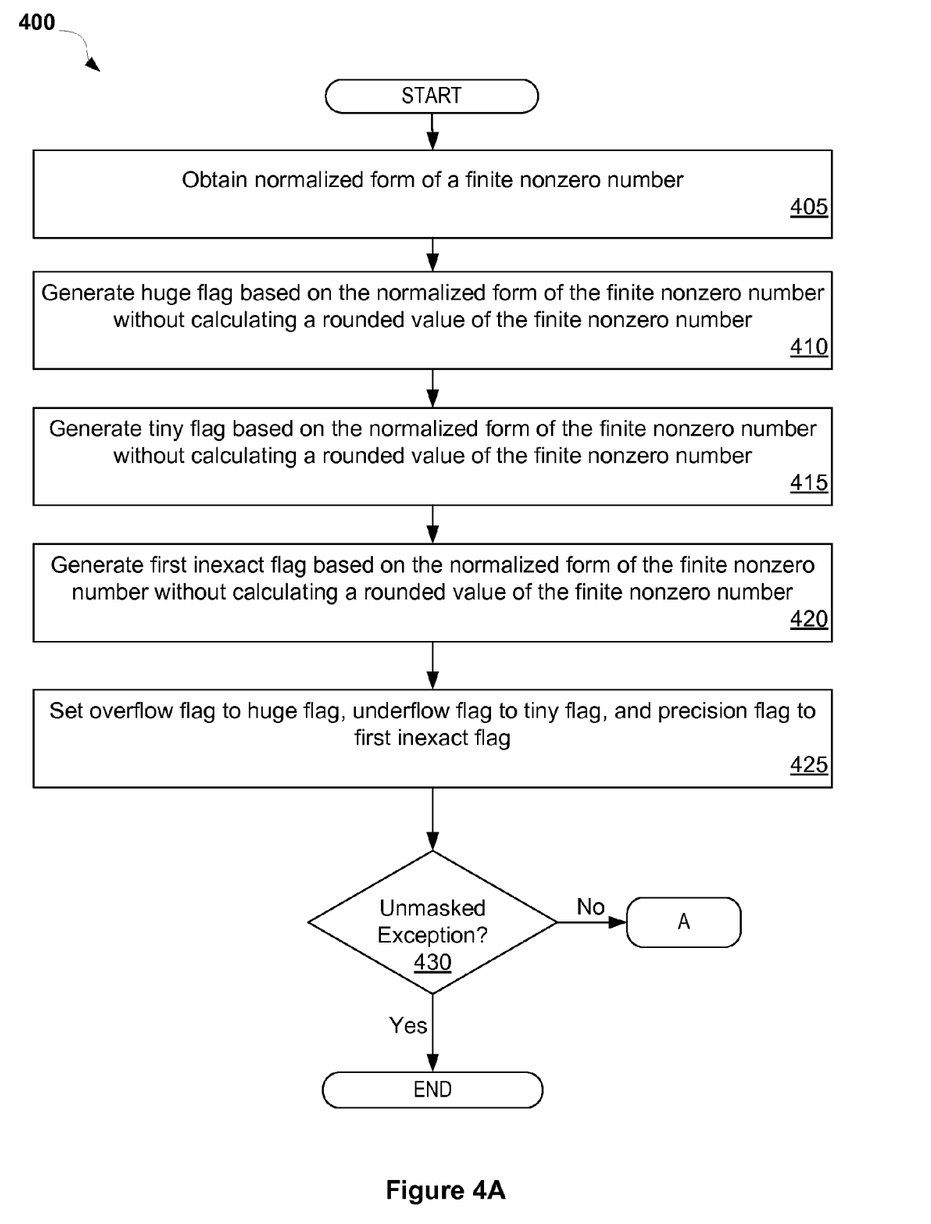
FIGS. 4A and 4B are flow diagrams illustrating a single method for generating status flags using a single-path floating point rounding operation according to an embodiment of the disclosure.
Figure 4B:
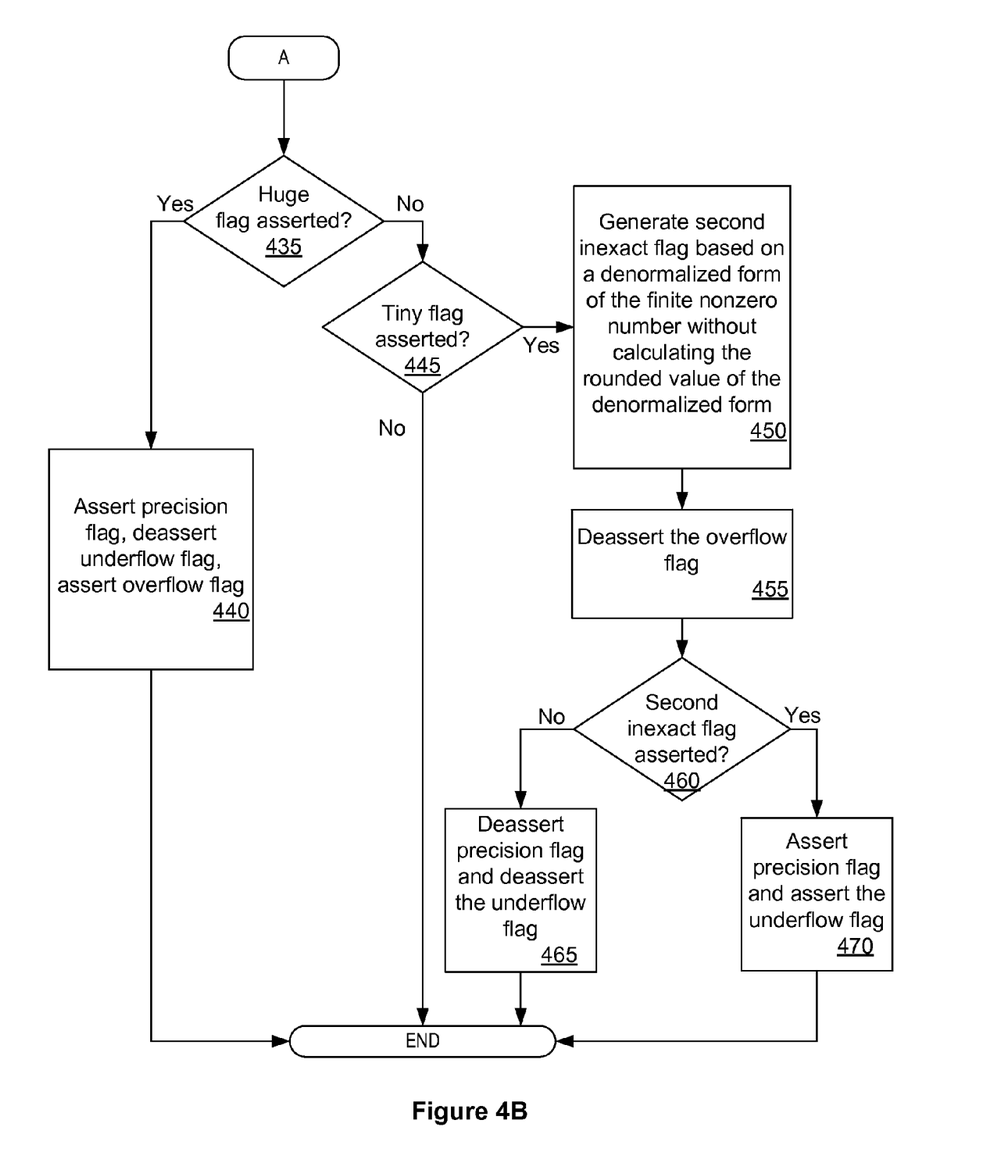

FIGS. 4A and 4B are a flow diagram illustrating a single method 400 for generating the status flags for a rounded value based on the finite nonzero number without calculating the rounded value of the finite nonzero number according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by processing device 100, and more specifically FPU 110 of FIG. 1.

At block 405, processing logic obtains a normalized form of a finite nonzero number. In one embodiment, processing logic obtains the normalized form of the finite nonzero number from a floating point unit or a data store associated with the floating point unit. In an alternate embodiment, processing logic obtains the normalized form of the finite nonzero number by requesting the normalized form of the finite nonzero number from a floating point unit and receiving the normalized form from the floating point unit. In one embodiment, the finite nonzero number is a result of a calculation of an FPU operation, such as addition, subtraction, multiplication, division, square root, and so on. The format of the finite nonzero number can be represented by a fraction value (mantissa), an exponent value, and a sign (positive or negative) of the exponent value. A mantissa (also known as a coefficient or significand) is part of a floating point number that includes its significant bits. For example, the finite nonzero number 6.6 can be represented as a binary floating point number with a binary integer mantissa of 110110 and an exponent of −3: $110110 \times 2^{-3}$. This same finite nonzero number can also be represented in normalized form with a fractional coefficient of 1.10110 and an exponent of +2: $1.10110 \times 2^{+2}$. Thus, the normalized form of the finite nonzero number can include a mantissa made up of a leading bit of 1 and a number of fraction bits (the number of fraction bits can be an infinite number), multiplied by a 2 to the power of an exponent. For example, the normalized form of the finite nonzero number of 10.111111 can be represented by the normalized form $1.0111111 * 2^{+1}$.

At block 410, processing logic generates a huge flag based on the normalized form of the finite nonzero number without calculating a rounded value of the finite nonzero number. The huge flag can indicate whether the exponent of the rounded value of the finite nonzero number (in normalized form) is greater than the predefined maximum value for the exponent. Processing logic generates the huge flag based on the normalized form of the finite nonzero number by determining whether the exponent of the finite nonzero number is greater than the predefined maximum value for the exponent. If processing logic determines that the exponent of the finite nonzero number is greater than the predefined maximum value, processing logic asserts the huge flag (e.g., 1). If processing logic determines that the exponent of the finite nonzero number is greater than the predefined maximum value, then the exponent of the rounded value of the normalized form of the finite nonzero number will also be greater than the predefined maximum value for the exponent because rounding may either increment the normalized form of the finite nonzero number or leave the normalized form of the finite nonzero number the same. If processing logic determines that the exponent of the normalized form of the finite nonzero number is not greater than the predefined maximum value, processing logic can determine whether a round up to huge will occur in order to determine the huge flag. Processing logic can determine whether a round up to huge will occur by determining whether the exponent is equal to the predefined maximum value (e.g., $E_{max}$) and whether the leading N fraction bits of the mantissa of the normalized value of the finite nonzero value are all equal to one (1.1111 . . . , where N is equal to the number of available bits defined by a standard) and whether the rounding mode would have incremented the normalized form of the finite nonzero number. The rounding mode of a floating point unit determines how a value will be rounded in the floating point unit. The rounding modes available to the floating point unit can be defined by a standard, such as IEEE 754. Examples of the rounding modes can include: round to nearest even (RNE), round towards negative infinity (RNI), round towards positive infinity (RPI), and round towards zero (RTZ). Processing logic can determine if the exponent of the normalized form of the finite nonzero number is equal to the predefined maximum value of the exponent by comparing the exponent of the normalized form of the finite nonzero number with the predefined maximum value of the exponent. For example, if the normalized form of the finite nonzero number is $1.11111111111111111111111 * 2^{+127}$, with single precision (predefined maximum value of the exponent is +127 and the predefined number of bits to use for rounding is 23 bits) and the rounding mode is RPI, then a round up to huge will occur because the exponent of the normalized form of the finite nonzero number is +127 which is equal to the predefined maximum of +127, the leading 23 bits of the fraction are all ones, and the RPI rounding mode would have rounded up, or incremented, the normalized form of the finite nonzero number. Therefore, in this example, if the rounding had been performed, the rounded value of the finite nonzero value would have resulted in a huge value, because the rounded value, written in normalized form, would have been $1.0 * 2^{+128}$. However, there is no need to perform the rounding, since a determination can be made that a round up to huge would have occurred by analyzing the bits of the normalized form of the finite nonzero value. If processing logic determines that the exponent of the normalized form of the finite nonzero number is equal to the predefined maximum value of the exponent and that the leading N fraction bits of the mantissa of the normalized value of the finite nonzero value are all ones and that the rounding mode would have incremented the normalized form of the finite nonzero number, then processing logic can determine that a round up to huge would have occurred and can assert the huge flag (e.g., 1). If processing logic determines that the exponent of the normalized form of the finite nonzero number is not equal to the predefined maximum value of the exponent or that the leading N fraction bits of the mantissa of the normalized value of the finite nonzero value are not all ones or that the rounding mode would not have incremented the normalized form of the finite nonzero number, then processing logic can determine that a round up to huge would not have occurred and can deassert the huge flag (e.g., 0).

At block 415, processing logic generates a tiny flag based on the normalized form of the finite nonzero number without calculating a rounded value of the finite nonzero number. The tiny flag can indicate whether the exponent of the rounded value of the finite nonzero number (in normalized form) is less than the predefined minimum value for the exponent. Processing logic generates the tiny flag based on the normalized form of the finite nonzero number by determining whether the exponent of the finite nonzero number is greater than the predefined minimum value for the exponent. If processing logic determines that the exponent of the finite nonzero number is greater than the predefined minimum value, processing logic deasserts the tiny flag (e.g., 0). If processing logic determines that the exponent of the finite nonzero number is greater than the predefined minimum value, then the exponent of the rounded value of the normalized form of the finite nonzero number will also be greater than the predefined minimum value for the exponent because rounding may either increment the normalized form of the finite nonzero number or leave the normalized form of the finite nonzero number the same, and therefore the exponent will not be tiny. If processing logic determines that the exponent of the normalized form of the finite nonzero number is not greater than the predefined minimum value, processing logic can determine whether a round up to normal will occur in order to determine the tiny flag. Processing logic can determine whether a round up to normal will occur by determining whether the exponent of the normalized form of the finite nonzero number is one less than the predefined minimum value of the exponent (e.g., $E_{min}-1$) and whether the leading N fraction bits of the mantissa of the normalized value of the finite nonzero value are all equal to one (1.1111 . . . , where N is equal to the number of available bits defined by a standard), and whether the rounding mode would have incremented the normalized form of the finite nonzero number. Processing logic can determine if the exponent of the normalized form of the finite nonzero number is one less than the predefined minimum value of the exponent by comparing the exponent with the predefined minimum value of the exponent. For example, if the normalized form of the finite nonzero number is $1.11111111111111111111111 * 2^{-127}$, with single precision (predefined minimum value of the exponent is −126 and the predefined number of bits to use for rounding is 23 bits) and a rounding mode of RPI, then a round up to normal will occur because the exponent of the normalized form of the finite nonzero number is −127 which is one less than the predefined −126, the leading 23 bits of the fraction are all equal to one, and the RPI rounding mode would have rounded up, or incremented, the normalized form of the finite nonzero number. Therefore, in this example, if the rounding had been performed, the rounded value of the finite nonzero value would have resulted in a round up to normal, and therefore not a tiny value, because the rounded value, written in normalized form, would have been $1.0 * 2^{-126}$. However, there is no need to perform the rounding, since a determination can be made that a round up to normal would have occurred by analyzing the bits of the normalized form of the finite nonzero value. If processing logic determines that the exponent of the normalized form of the finite nonzero number is one less than the predefined minimum value of the exponent and that the leading N fraction bits of the mantissa of the normalized value of the finite nonzero value are all ones and that the rounding mode would have incremented the normalized form of the finite nonzero number, then processing logic can determine that a round up to normal would have occurred and can deassert the tiny flag (e.g., 0). If processing logic determines that the exponent of the normalized form of the finite nonzero number is not equal to one less than the predefined minimum value of the exponent or that the leading N fraction bits of the mantissa of the normalized value of the finite nonzero value are not all ones or that the rounding mode would not have incremented the normalized form of the finite nonzero number, then processing logic can determine that a round up to normal would not have occurred and can assert the tiny flag (e.g., 1).

At block 420, processing logic generates a first inexact flag based on the finite nonzero number without calculating a rounded value of the finite nonzero number. The first inexact flag can indicate whether the rounded value of the normalized form of the finite nonzero number is less than or greater than the finite nonzero number. The first inexact flag can indicate whether any of the fraction bits that were discarded during the (first) rounding process, had it occurred, were non-zero. For example, if the finite nonzero number is $1.11111111111111111111111111111111 * 2^{-12}$ for rounding in single precision, 23 bits of the fraction are saved during the rounding process and the remaining bits of the fraction are discarded. In this example, because the fraction bits that would be discarded in the rounding process are nonzero, the rounded value will be inexact (either smaller or larger than the finite nonzero number depending on the rounding mode). However, there is no need to calculate the rounded value, since processing logic can determine the first inexact flag based on the normalized form of the finite nonzero number. Processing logic can determine the first inexact flag by determining whether any of the bits after (to the right of) the first N fraction bits of the mantissa of the normalized value of the finite nonzero value are non-zero (or one), where N is determined based on the number of available bits defined by a standard (e.g., 23 bits for single precision and 54 bits for double precision). If processing logic determines that any of the bits after the first N fraction bits of the mantissa are non-zero, then processing logic can assert the first inexact flag (e.g., 1) because the rounded value of the finite nonzero number would not be equal to the finite nonzero number if the rounded value was calculated. If processing logic determines that none of the bits after the first N fraction bits of the mantissa are non-zero, then processing logic can deassert the first inexact flag (e.g., 0) because the rounded value of the finite nonzero number would be equal to the finite nonzero number if the rounded value was calculated.

At block 425, processing logic sets an overflow flag to be equal to the huge flag, sets an underflow flag to be equal to the tiny flag, and sets a precision flag to be equal to the first inexact flag.

At block 430, processing logic determines whether an unmasked exception has occurred. Processing logic can determine whether an unmasked exception has occurred based on the status flags. An unmasked exception can represent whether an application, such as a microcode program or a user-level program, would like to be notified when one of the status flags is asserted (e.g., positive). The unmasked exception can be calculated as:

Unmasked exception=|({precision flag,underflow flag, overflow flag}&{~precision mask,~underflow mask,~overflow mask}), where

| is an OR operator,
& is an AND operator,
~ is a complement operator,
precision mask is a mask for the precision flag,
underflow mask is a mask for the underflow flag,
overflow mask is a mask for the overflow flag.

When an unmasked exception occurs, the application is notified and the rounded value of the finite nonzero number may not be calculated and the status flags may remain unchanged. If processing logic determines there is an unmasked exception, the method 400 ends. If processing logic determines there is no unmasked exception, the method 400 proceeds to "A", which begins at block 435.

At block 435, processing logic determines if the huge flag is asserted. Processing logic can determine that the huge flag is asserted by comparing the huge flag to a predefined value (e.g., positive or 1). If processing logic determines that the huge flag is asserted, the method 400 proceeds to block 440. If processing logic determines that the huge flag is not asserted, the method 400 proceeds to block 445.

At block 440, processing logic asserts the precision flag, deasserts the underflow flag, and asserts the overflow flag. Processing logic can assert the precision flag by assigning the precision flag to a predefined value (e.g., 1). Processing logic can deassert the underflow flag by assigning the precision flag to a predefined value (e.g., 0). Processing logic can assert the overflow flag by assigning the overflow flag to a predefined value (e.g., 1).

At block 445, processing logic determines whether the tiny flag is asserted. Processing logic can determine that the tiny flag is asserted by comparing the tiny flag to a predefined value (e.g., 1). If processing logic determines that the tiny flag is asserted, the method 400 proceeds to block 450. If processing logic determines that the tiny flag is not asserted, the method 400 ends.

At block 450, processing logic generates a second inexact flag based on a denormalized form of the finite nonzero number without calculating a rounded value of the finite nonzero number. The second inexact flag can indicate whether the rounded value of the denormalized form of the finite nonzero number is less than or greater than the finite nonzero number. The second inexact status flag can indicate whether any of the fraction bits that were discarded when the (second) rounded value was calculated, had the calculation been performed, were non-zero. However, there is no need to calculate the (second) rounded value, since processing logic can determine the second inexact flag based on the denormalized form of the finite nonzero number. Processing logic can determine the second inexact flag by determining whether any of the bits after (to the right of) the first N fraction bits of the mantissa of the denormalized form of the finite nonzero value are non-zero (or one), where N is determined based on the number of available bits defined by a standard (e.g., 23 bits for single precision and 54 bits for double precision). If processing logic determines that any of the bits after the first N fraction bits of the mantissa are non-zero, then processing logic can assert the second inexact flag (e.g., set the value of the second inexact flag to 1) because the rounded value of the finite nonzero number would not be equal to the finite nonzero number if a (second) rounded value of the denormalized form had been calculated. If processing logic determines that none of the bits after the first N fraction bits of the mantissa are non-zero, then processing logic can deassert the second inexact flag (e.g., set the value of the second inexact flag to 0) because the rounded value of the finite nonzero number would be equal to the finite nonzero number if a (second) rounded value of the denormalized form had been calculated.

In one embodiment, prior to generating the second inexact flag based on the denormalized form of the finite nonzero number, processing logic denormalizes the normalized form of the finite nonzero number. In one embodiment, processing logic denormalizes the normalized form of the finite nonzero number by incrementing the exponent of the normalized form of the finite nonzero number to the predefined minimum value of the exponent and right shifting the value of the normalized form of the finite nonzero number by the incremented value. For example, if the normalized form of the finite nonzero number is $1.110110001010*2^{-1026}$ and the predefined minimum value of the exponent is −1022, to denormalize the normalized form of the finite nonzero number, the exponent is incremented by 4 to −1022 (since −1026+4=−1022) and the value is right shifted by 4 bits. Therefore, in this example, for a normalized form of the finite nonzero number is $1.110110001010*2^{-1026}$, the denormalized form is $0.0001110110001010*2^{-1022}$.

At block 455, processing logic deasserts the overflow flag (e.g., sets the value of the overflow flag to 0) and asserts the underflow flag (e.g., sets the value of the underflow flag to 1).

At block 460, processing logic determines whether the second inexact flag is asserted. Processing logic can determine if the second inexact flag is asserted by comparing the second inexact flag to a predefined value (e.g., 1). If processing logic determines that the second inexact flag is not asserted or deasserted (e.g., 0), meaning that a second rounded value, if it had been calculated, would have been an exact value of the finite nonzero number, the method 400 proceeds to block 465. If processing logic determines that the second inexact flag is asserted, meaning that the second rounded value, if it had been calculated, would have been an inexact value of the finite nonzero number, the method 400 proceeds to block 470. In some embodiments, if processing logic determines that the second inexact flag is asserted, processing logic further determines whether a precision mask is deasserted. In some embodiments, if processing logic determines that the second inexact flag is asserted and the precision mask is deasserted, processing logic determines that an unmasked exception has occurred and, the application is notified.

At block 465, processing logic deasserts the precision flag (e.g., sets the value of the precision flag to 0) and deasserts the underflow flag (e.g., sets the value of the underflow flag to 0).

At block 470, processing logic asserts the precision flag (e.g., sets the value of the precision flag to 1) and asserts the underflow flag (e.g., sets the value of the underflow flag to 1).

Figure 5:
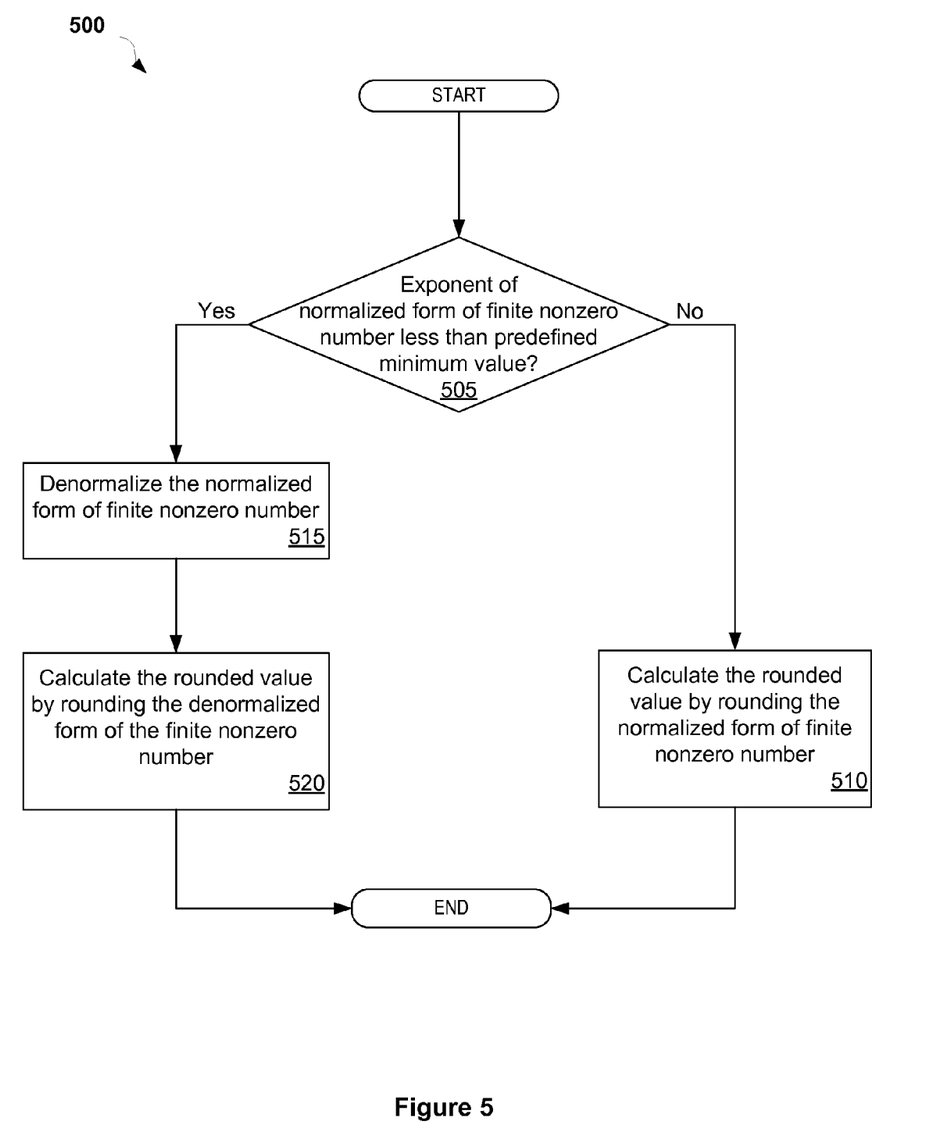
FIG. 5 is a flow diagram illustrating a method for calculating a rounded value using blended reduced precision rounding according to an embodiment of the disclosure.

FIG. 5 is a flow diagram illustrating a method 500 for calculating the rounded value of the finite nonzero number based on a blended reduced precision rounding according to an embodiment of the disclosure. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by processing device 100, and more specifically FPU 110 of FIG. 1.

At block 505, processing logic determines if an exponent of the normalized form of the finite nonzero number is less than a predefined minimum value. In one embodiment, the predefined minimum value is defined by a standard, such as IEEE. 754. For example, IEEE 754 defines the predefined minimum value for the exponent to be −126 for single precision and −1022 for double precision. In an alternate embodiment, the predefined minimum value is defined by an administrator or a user of a computing system. If the exponent is less than the predefined minimum value, the first rounding (calculating of a first rounded value) usually performed by a two-pass rounder can be bypassed because the exponent will not fit in the predefined minimum value of bits and the finite nonzero number will need to be denormalized in order to bring up the value of the exponent to fit in the available bits for the exponent. If the exponent is not less than (and is therefore greater than or equal to) the predefined minimum value, the first rounding (calculating of a first rounded value) usually performed by a two-pass rounder can be performed and the second rounding (calculating of a second rounded value) usually performed by the two-pass rounder can be skipped because the value of the exponent of the rounded value will fit in the available bits for the exponent and therefore no denormalization needs to be performed. If processing logic determines that the exponent of the normalized form of the finite nonzero number is less than the predefined minimum value, the method 500 proceeds to block 515. If processing logic determines that the exponent of the normalized form of the finite nonzero number is not less than the predefined minimum value, the method 500 proceeds to block 510.

At block 510, processing logic calculates the rounded value by rounding the normalized form of the finite nonzero number. In one embodiment, processing logic rounds the normalized form of the finite nonzero number by selecting a predefined number of the fraction bits of the normalized form and determining whether to increment the value of the selected fraction bits based on the unselected bits and the rounding mode. In one embodiment, predefined number of fraction bits that are selected is defined by a standard, such as IEEE 754. In some embodiments, rounding the normalized form of the finite nonzero number is performed in the same manner as a first rounding of a two-pass rounder would be performed as known in the art.

At block 515, processing logic denormalizes the normalized form of the finite nonzero number. In one embodiment, processing logic denormalizes the normalized form of the finite nonzero number by incrementing the exponent of the normalized form of the finite nonzero number to the predefined minimum value of the exponent and right shifting the value of the normalized form of the finite nonzero number by the incremented value. For example, if the normalized form of the finite nonzero number is $1.110110001010 * 2^{-1026}$ and the predefined minimum value of the exponent is −1022, to denormalize the normalized form of the finite nonzero number, the exponent is incremented by 4 to −1022 (since −1026+ 4=−1022) and the value is right shifted by 4 bits. Therefore, in this example, for a normalized form of the finite nonzero number is $1.110110001010 * 2^{-1026}$, the denormalized form is $0.0001110110001010 * 2^{-1022}$.

At block 520, processing logic calculates the rounded value by rounding the denormalized form of the finite nonzero number. In one embodiment, processing logic rounds the denormalized form of the finite nonzero number by selecting a predefined number of the fraction bits of the denormalized form and determining whether to increment the value of the selected fraction bits based on the unselected bits and the rounding mode. In one embodiment, predefined number of fraction bits that are selected is defined by a standard, such as IEEE 754. In some embodiments, rounding the denormalized form of the finite nonzero number is performed in the same manner as a second rounding of a two-pass rounder would be performed as known in the art.

Figure 6:
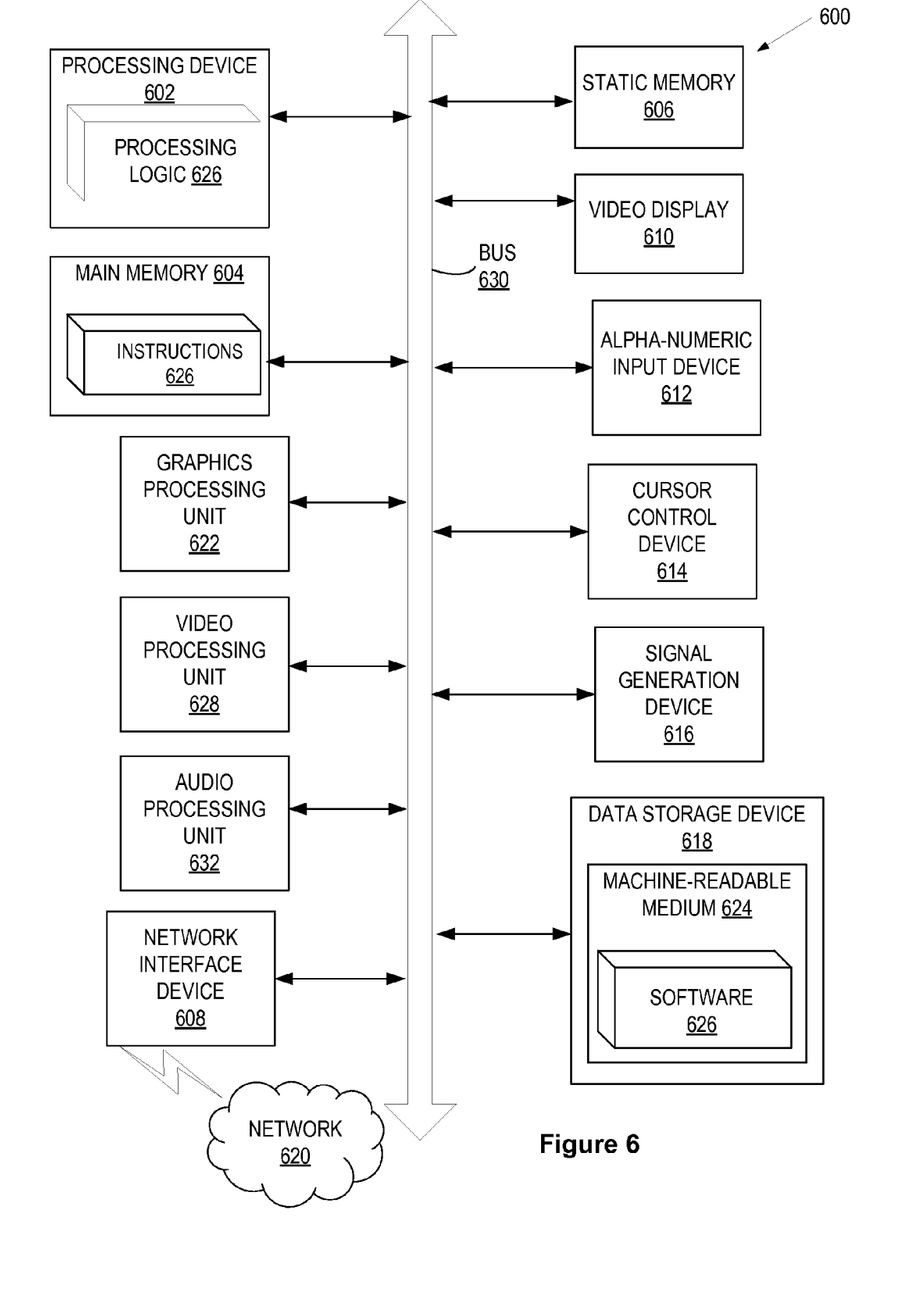
FIG. 6 illustrates a block diagram of one embodiment of a computer system.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. In one embodiment, processing device 602 may include one or processing cores. The processing device 602 is configured to execute the processing logic 626 for performing the operations and steps discussed herein. In one embodiment, processing device 602 is the same as processing device 100 described with respect to FIG. 1 that implements single-path floating-point rounding in an FPU. For example, processing device 602 may include a single-path rounding module 115 of FIG. 1.

The computer system 600 may further include a network interface device 608 communicably coupled to a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker). Furthermore, computer system 600 may include a graphics processing unit 622, a video processing unit 628, and an audio processing unit 632.

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 utilizing an FPU of processor 602 that performs single-path floating-point rounding, such as described with respect to processing device 100 in FIG. 1, and/or a software library containing methods that call the above applications. While the machine-accessible storage medium 624 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

In the foregoing description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "generating", "determining", "calculating", "obtaining", "asserting", "deasserting", "denormalizing", "rounding", "comparing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A system, comprising:
    a memory; and
    a processing device communicably coupled to the memory, the processing device comprising a floating point unit (FPU) to:
        generate a plurality of status flags for a rounded value of a finite nonzero number, wherein the plurality of status flags are generated based on the finite nonzero number without calculating the rounded value of the finite nonzero number, wherein the plurality of status flags comprises an overflow flag, an underflow flag and a precision flag;
        determine whether the overflow flag is asserted;
        upon determining that the overflow flag is asserted, calculate the rounded value of the finite nonzero number based on an overflow rounding;
        upon determining that the overflow flag is not asserted, calculate the rounded value of the finite nonzero number based on a blended reduced precision rounding;
        generate a huge flag and a tiny flag based on a normalized form of the finite nonzero number;
        generate a first inexact flag based on the normalized form of the finite non-zero number;
        set the underflow flag to the tiny flag;
        set the precision flag to the first inexact flag;
        upon determining that an unmasked exception has not occurred,
            upon determining that the huge flag is not asserted and upon determining that the tiny flag is asserted:
                generate a second inexact flag based on a denormalized form of the finite nonzero number without calculating the rounded value of the finite nonzero number;
                update the precision flag based on the second inexact flag; and
                update the underflow flag based on the second inexact flag.

2. The system of claim 1, wherein to generate the plurality of status flags for the rounded value of the finite nonzero number, the processing device is to:
    determine whether the huge flag is asserted;
    upon determining that the huge flag is asserted, assert the overflow flag; and
    upon determining that the huge flag is not asserted, set the overflow flag to the huge flag.

3. The system of claim 2, wherein to generate the huge flag based on the normalized form of the finite nonzero number, the processing device is to:
    determine whether an exponent of the normalized form of the finite nonzero number is greater than a predefined maximum value;
    upon determining that the exponent of the normalized form of the finite nonzero number is greater than the predefined maximum value, assert the huge flag; and
    upon determining that the exponent of the normalized form of the finite nonzero number is not greater than the predefined maximum value,
        determine whether a round up to huge will occur based on the normalized form of the finite nonzero number and a rounding mode,
        upon determining that a round up to huge will occur based on the normalized form of the finite nonzero number and the rounding mode, assert the huge flag, and
        upon determining that a round up to huge will not occur based on the normalized form of the finite nonzero number and the rounding mode, deassert the huge flag.

4. The system of claim 1, wherein to generate the tiny flag based on the normalized form of the finite nonzero number, the processing device is to:
    determine whether an exponent of the normalized form of the finite nonzero number is greater than a predefined minimum value;
    upon determining that the exponent of the normalized form of the finite nonzero number is greater than the predefined minimum value, deassert the tiny flag; and
    upon determining that the exponent of the normalized form of the finite nonzero number is not greater than the predefined maximum value,
        determine whether a round up to normal will occur based on the normalized form of the finite nonzero number and a rounding mode,
        upon determining that a round up to normal will occur based on the normalized form of the finite nonzero number and the rounding mode, deassert the tiny flag, and
        upon determining that a round up to normal will not occur based on the normalized form of the finite nonzero number and the rounding mode, assert the tiny flag.

5. The system of claim 1, wherein to calculate the rounded value of the finite nonzero number based on a blended reduced precision rounding, the processing device is further to:
    determine whether an exponent of a normalized form of the finite nonzero number is less than a predefined minimum value;
    upon determining that the exponent of the normalized form of the finite nonzero number is less than the predefined minimum value,
        generate a denormalized form of the finite nonzero number by denormalizing the finite nonzero number, and
        calculate the rounded value of the finite nonzero number to be a result of rounding the denormalized form of the finite nonzero number; and
    upon determining that the exponent of the normalized form of the finite nonzero number is not less than the predefined minimum value, calculate the rounded value of the finite nonzero number to be a result of rounding the normalized form of the finite nonzero number.

6. A method comprising:
    generating, by a floating point unit (FPU) of a processing device, a plurality of status flags for a rounded value of a finite nonzero number, wherein the plurality of status flags are generated based on the finite nonzero number without calculating the rounded value of the finite nonzero number, wherein the plurality of status flags comprises an overflow flag, an underflow flag and a precision flag;
    determining, by the FPU, whether the rounded value should be calculated for the finite nonzero number based on the plurality of status flags and whether the overflow flag is asserted;
    upon determining that the rounded value should be calculated for the finite nonzero number based on the plurality of status flags and that the overflow flag is asserted, calculating the rounded value of the finite nonzero number based on an overflow rounding;
upon determining that the rounded value should be calculated for the finite nonzero number based on the plurality of status flags and that the overflow flag is not asserted, calculating the rounded value of the finite nonzero number based on a blended reduced precision rounding;
generating, by the FPU, a huge flag and a tiny flag based on a normalized form of the finite nonzero number;
generating, by the FPU, a first inexact flag based on the normalized form of the finite nonzero number;
setting the underflow flag to the tiny flag;
setting the precision flag to the first inexact flag;
upon determining that an unmasked exception has not occurred,
    upon determining that the huge flag is not asserted and upon determining that the tiny flag is asserted:
        generating, by the FPU, a second inexact flag based on a denormalized form of the finite nonzero number without calculating the rounded value of the finite nonzero number;
        updating, by the FPU, the precision flag based on the second inexact flag; and
        updating, by the FPU, the underflow flag based on the second inexact flag.

7. The method of claim 6, wherein generating the plurality of status flags for the rounded value of the finite nonzero number comprises:
determining whether the huge flag is asserted;
upon determining that the huge flag is asserted, asserting the overflow flag; and
upon determining that the huge flag is not asserted, setting the overflow flag to the huge flag.

8. The method of claim 7, wherein generating the huge flag based on the normalized form of the finite nonzero number comprises:
determining whether an exponent of the normalized form of the finite nonzero number is greater than a predefined maximum value;
upon determining that the exponent of the normalized form of the finite nonzero number is greater than the predefined maximum value, asserting the huge flag; and
upon determining that the exponent of the normalized form of the finite nonzero number is not greater than the predefined maximum value,
    determining whether a round up to huge will occur based on the normalized form of the finite nonzero number and a rounding mode,
    upon determining that a round up to huge will occur based on the normalized form of the finite nonzero number and the rounding mode, asserting the huge flag, and
    upon determining that a round up to huge will not occur based on the normalized form of the finite nonzero number and the rounding mode, deasserting the huge flag.

9. The method of claim 6, wherein generating the tiny flag based on the normalized form of the finite nonzero number comprises:
determining whether an exponent of the normalized form of the finite nonzero number is greater than a predefined minimum value;
upon determining that the exponent of the normalized form of the finite nonzero number is greater than the predefined minimum value, deasserting the tiny flag; and
upon determining that the exponent of the normalized form of the finite nonzero number is not greater than the predefined maximum value,
    determining whether a round up to normal will occur based on the normalized form of the finite nonzero number and a rounding mode,
    upon determining that a round up to normal will occur based on the normalized form of the finite nonzero number and the rounding mode, deasserting the tiny flag, and
    upon determining that a round up to normal will not occur based on the normalized form of the finite nonzero number and the rounding mode, asserting the tiny flag.

10. The method of claim 6, wherein calculating the rounded value of the finite nonzero number based on a blended reduced precision rounding comprises:
determining whether an exponent of a normalized form of the finite nonzero number is less than a predefined minimum value;
upon determining that the exponent of the normalized form of the finite nonzero number is less than the predefined minimum value,
    generating a denormalized form of the finite nonzero number by denormalizing the finite nonzero number, and
    calculating the rounded value of the finite nonzero number to be a result of rounding the denormalized form of the finite nonzero number; and
upon determining that the exponent of the normalized form of the finite nonzero number is not less than the predefined minimum value, calculating the rounded value of the finite nonzero number to be a result of rounding the normalized form of the finite nonzero number.

11. A non-transitory machine-readable storage medium including data and instructions that, when accessed by a machine, cause the machine to:
generate, by a processing device of the machine, a plurality of status flags for a rounded value of a finite nonzero number, wherein the plurality of status flags are generated based on the finite nonzero number without calculating the rounded value of the finite nonzero number, wherein the plurality of status flags comprises an overflow flag, an underflow flag and a precision flag;
determine, by the processing device, whether the rounded value should be calculated for the finite nonzero number based on the plurality of status flags and whether the overflow flag is asserted;
upon determining that the rounded value should be calculated for the finite nonzero number based on the plurality of status flags and that the overflow flag is asserted, calculate, by the processing device, the rounded value of the finite nonzero number based on an overflow rounding;
upon determining that the rounded value should be calculated for the finite nonzero number based on the plurality of status flags and that the overflow flag is not asserted, calculate, by the processing device, the rounded value of the finite nonzero number based on a blended reduced precision rounding;
generate, by the processing device, a huge flag and a tiny flag based on a normalized form of the finite nonzero number;
generate a first inexact flag based on the normalized form of the finite nonzero number;
set the underflow flag to the tiny flag;
set the precision flag to the first inexact flag;

upon determining that an unmasked exception has not occurred,
upon determining that the huge flag is not asserted and upon determining that the tiny flag is asserted, and by the processing device:
generate a second inexact flag based on a denormalized form of the finite nonzero number without calculating the rounded value of the finite nonzero number;
update the precision flag based on the second inexact flag; and
update the underflow flag based on the second inexact flag.

12. The non-transitory machine-readable storage medium of claim 11, wherein, to generate the plurality of status flags for the rounded value of the finite nonzero number, further comprising instructions to cause the machine to:
determine whether the huge flag is asserted;
upon determining that the huge flag is asserted, assert the overflow flag; and
upon determining that the huge flag is not asserted, set the overflow flag to the huge flag.

13. The non-transitory machine-readable storage medium of claim 12, wherein, to generate the huge flag based on the normalized form of the finite nonzero number, further comprising instructions to cause the machine to:
determine whether an exponent of the normalized form of the finite nonzero number is greater than a predefined maximum value;
upon determining that the exponent of the normalized form of the finite nonzero number is greater than the predefined maximum value, assert the huge flag; and
upon determining that the exponent of the normalized form of the finite nonzero number is not greater than the predefined maximum value,
determine whether a round up to huge will occur based on the normalized form of the finite nonzero number and a rounding mode,
upon determining that a round up to huge will occur based on the normalized form of the finite nonzero number and the rounding mode, assert the huge flag, and
upon determining that a round up to huge will not occur based on the normalized form of the finite nonzero number and the rounding mode, deassert the huge flag.

14. The non-transitory machine-readable storage medium of claim 11, wherein, to generate the tiny flag based on the normalized form of the finite nonzero number, further comprising instructions to cause the machine to:
determine whether an exponent of the normalized form of the finite nonzero number is greater than a predefined minimum value;
upon determining that the exponent of the normalized form of the finite nonzero number is greater than the predefined minimum value, deassert the tiny flag; and
upon determining that the exponent of the normalized form of the finite nonzero number is not greater than the predefined maximum value,
determine whether a round up to normal will occur based on the normalized form of the finite nonzero number and a rounding mode,
upon determining that a round up to normal will occur based on the normalized form of the finite nonzero number and the rounding mode, deassert the tiny flag, and
upon determining that a round up to normal will not occur based on the normalized form of the finite nonzero number and the rounding mode, assert the tiny flag.

15. The non-transitory machine-readable storage medium of claim 11, wherein, to calculate the rounded value of the finite nonzero number based on a blended reduced precision rounding, further comprising instructions to cause the machine to:
determine whether an exponent of a normalized form of the finite nonzero number is less than a predefined minimum value;
upon determining that the exponent of the normalized form of the finite nonzero number is less than the predefined minimum value,
generate a denormalized form of the finite nonzero number by denormalizing the finite nonzero number, and
calculate the rounded value of the finite nonzero number to be a result of rounding the denormalized form of the finite nonzero number; and
upon determining that the exponent of the normalized form of the finite nonzero number is not less than the predefined minimum value, calculate the rounded value of the finite nonzero number to be a result of rounding the normalized form of the finite nonzero number.

16. A processing device comprising:
a plurality of registers;
a main processing unit; and
a floating point unit (FPU) communicably coupled to the main processing unit, the FPU to:
generate a plurality of status flags for a rounded value of a finite nonzero number, wherein the plurality of status flags are generated based on the finite nonzero number without calculating the rounded value of the finite nonzero number, wherein the plurality of status flags comprises an overflow flag, an underflow flag and a precision flag;
determine whether the overflow flag is asserted;
upon determining that the overflow flag is asserted, calculate the rounded value of the finite nonzero number based on an overflow rounding;
upon determining that the overflow flag is not asserted, calculate the rounded value of the finite nonzero number based on a blended reduced precision rounding;
generate a huge flag and a tiny flag based on a normalized form of the finite nonzero number;
generate a first inexact flag based on the normalized form of the finite non-zero number;
set the underflow flag to the tiny flag;
set the precision flag to the first inexact flag;
upon determining that an unmasked exception has not occurred,
upon determining that the huge flag is not asserted and upon determining that the tiny flag is asserted:
generate a second inexact flag based on a denormalized form of the finite nonzero number without calculating the rounded value of the finite nonzero number;
update the precision flag based on the second inexact flag; and
update the underflow flag based on the second inexact flag.

17. The processing device of claim 16, wherein to generate the plurality of status flags for the rounded value of the finite nonzero number, the FPU is to:

determine whether the huge flag is asserted;
upon determining that the huge flag is asserted, assert the overflow flag; and
upon determining that the huge flag is not asserted, set the overflow flag to the huge flag.

18. The processing device of claim 17, wherein to generate the huge flag based on the normalized form of the finite nonzero number, the FPU is to:
  determine whether an exponent of the normalized form of the finite nonzero number is greater than a predefined maximum value;
  upon determining that the exponent of the normalized form of the finite nonzero number is greater than the predefined maximum value, assert the huge flag; and
  upon determining that the exponent of the normalized form of the finite nonzero number is not greater than the predefined maximum value,
    determine whether a round up to huge will occur based on the normalized form of the finite nonzero number and a rounding mode,
    upon determining that a round up to huge will occur based on the normalized form of the finite nonzero number and the rounding mode, assert the huge flag, and
    upon determining that a round up to huge will not occur based on the normalized form of the finite nonzero number and the rounding mode, deassert the huge flag.

19. The processing device of claim 16, wherein to generate the tiny flag based on the normalized form of the finite nonzero number, the FPU is to:
  determine whether an exponent of the normalized form of the finite nonzero number is greater than a predefined minimum value;
  upon determining that the exponent of the normalized form of the finite nonzero number is greater than the predefined minimum value, deassert the tiny flag; and
  upon determining that the exponent of the normalized form of the finite nonzero number is not greater than the predefined maximum value,
    determine whether a round up to normal will occur based on the normalized form of the finite nonzero number and a rounding mode,
    upon determining that a round up to normal will occur based on the normalized form of the finite nonzero number and the rounding mode, deassert the tiny flag, and
  upon determining that a round up to normal will not occur based on the normalized form of the finite nonzero number and the rounding mode, assert the tiny flag.

20. The processing device of claim 16, wherein to calculate the rounded value of the finite nonzero number based on a blended reduced precision rounding, the FPU is further to:
  determine whether an exponent of a normalized form of the finite nonzero number is less than a predefined minimum value;
  upon determining that the exponent of the normalized form of the finite nonzero number is less than the predefined minimum value,
    generate a denormalized form of the finite nonzero number by denormalizing the finite nonzero number, and
    calculate the rounded value of the finite nonzero number to be a result of rounding the denormalized form of the finite nonzero number; and
  upon determining that the exponent of the normalized form of the finite nonzero number is not less than the predefined minimum value, calculate the rounded value of the finite nonzero number to be a result of rounding the normalized form of the finite nonzero number.

* * * * *